(12) United States Patent
Singh et al.

(10) Patent No.: US 12,537,753 B2
(45) Date of Patent: Jan. 27, 2026

(54) METHOD AND SYSTEM FOR DETECTING MESSAGE LATENCY AND FAULTS WITHIN A COMPUTING SYSTEM

(71) Applicant: FORD GLOBAL TECHNOLOGIES, LLC, Dearborn, MI (US)

(72) Inventors: Haneet Singh, Detroit, MI (US); Dalton M. Woodard, Menlo Park, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 531 days.

(21) Appl. No.: 18/063,455

(22) Filed: Dec. 8, 2022

(65) Prior Publication Data

US 2024/0195719 A1 Jun. 13, 2024

(51) Int. Cl.
*G06F 15/16* (2006.01)
*H04L 43/0823* (2022.01)
*H04L 43/0852* (2022.01)
*H04L 43/0882* (2022.01)
*H04L 67/12* (2022.01)

(52) U.S. Cl.
CPC ...... *H04L 43/0852* (2013.01); *H04L 43/0823* (2013.01); *H04L 43/0882* (2013.01); *H04L 67/12* (2013.01)

(58) Field of Classification Search
CPC ............. H04L 43/0852; H04L 43/0823; H04L 43/0882; H04L 67/12
See application file for complete search history.

(56) References Cited

U.S. PATENT DOCUMENTS

| | | | |
|---|---|---|---|
| 7,849,459 B2 | 12/2010 | Burkhart et al. | |
| 10,915,402 B2 | 2/2021 | Chen et al. | |
| 11,164,403 B2 | 11/2021 | Nortman et al. | |
| 11,209,817 B2 | 12/2021 | Nortman et al. | |
| 11,335,141 B2 | 5/2022 | Binet et al. | |
| 11,650,585 B1 * | 5/2023 | Aschbacher | G07C 5/0816 |
| | | | 701/29.2 |
| 2020/0304523 A1 | 9/2020 | Yadav et al. | |
| 2020/0356089 A1 * | 11/2020 | Nortman | G07C 5/08 |
| 2022/0004680 A1 | 1/2022 | Schumann et al. | |

* cited by examiner

*Primary Examiner* — Normin Abedin
(74) *Attorney, Agent, or Firm* — Frank A. MacKenzie; Brooks Kushman, P.C.

(57) ABSTRACT

This document discloses system, method, and computer program product embodiments for detecting a fault or latency in a computing system, such as that of an autonomous vehicle. In the computing system, messages are received from subsystems of the vehicle that are publishers and transferred along a communication path to subsystems of the vehicle that are subscribers. The method includes receiving, from checkpoints along the communication path, for each of a group of messages that are transmitted along the communication path, a message ID and a timestamp indicating when the checkpoint receives the message, publishes the message, or publishes a result derived from the message. The method also includes using the message IDs and the timestamps to measure an amount of latency that occurred in the communication path before that message reached its corresponding subscriber. When the measured latency does not satisfy a threshold, the vehicle may take a remedial action.

16 Claims, 7 Drawing Sheets

METHOD AND SYSTEM FOR DETECTING MESSAGE LATENCY AND FAULTS WITHIN A COMPUTING SYSTEM

BACKGROUND

High-performance computing systems, such as those used in autonomous vehicles (AVs), must distribute data among multiple subsystems, as one subsystem may need another subsystem's data to make decisions, and vice versa. Many of the AV's subsystems will publish data, and other systems will subscribe to that data. For example, a motion planning system of an AV must receive and analyze data captured by the AV's perception system to plan a trajectory for the vehicle. The AV's motion control system will act upon data received from the AV's motion planning system.

In a typical vehicle run, an AV will receive thousands of different operational parameters from various sensors at varying rates. Subscribers to the subsystems that publish these parameters must be able to collect and act upon this data in real time with very low latency, not only to determine what action to take but also to identify and react to faults.

Traditional systems look for message faults by adding a schema to each message during transmission, which is checked by the subscriber upon receipt. Traditional systems also measure latency of a message simply by calculating the time difference between transmission and receipt of the message, or by determining that latency exists if a message is not received within a maximum period of time. Due to the complexity of high-performance computing systems such as those in AVs, this simplistic point-to-point approach of measuring latency is not sufficient, and it is a trailing indicator in that it can only detect latency after the message is delivered. It also does not consider timing aspects of serialization and deserialization of messages.

This document describes methods and systems that address the problems described above, and/or other issues.

SUMMARY

At least some of the problems associated with the existing solutions will be shown solved by the subject matter of the independent claims that are included in this document. Additional advantageous aspects are discussed in the dependent claims.

In various embodiments, this disclosure describes a method of detecting a fault or latency in a computing system, as well as systems and computer program products for implementing the method. The method includes, in a computing system via which messages are received from subsystems of the vehicle that are publishers and transferred along a communication path to subsystems of the vehicle that are subscribers: (i) receiving, from a plurality of checkpoints along the communication path, for each of a group of messages that are transmitted along the communication path, a message ID and a timestamp indicating when the checkpoint receives the message, publishes the message, or publishes a result derived from the message; (ii) using the message IDs and the timestamps to measure an amount of latency that occurred in the communication path before that message reached its corresponding subscriber; and (iii) upon determining that the measured latency does not satisfy a threshold, sending a signal to a system of the vehicle to take a remedial action.

Additional variations and embodiments are described below.

The methods described above may be embodied in a system including a processor and memory containing programming instructions that, when executed, will cause the processor to implement the actions described above. Various embodiments also include a computer program product that contains such programming instructions, and a memory containing the computer program product.

BRIEF DESCRIPTION OF THE DRAWINGS

The accompanying drawings are incorporated into this document and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
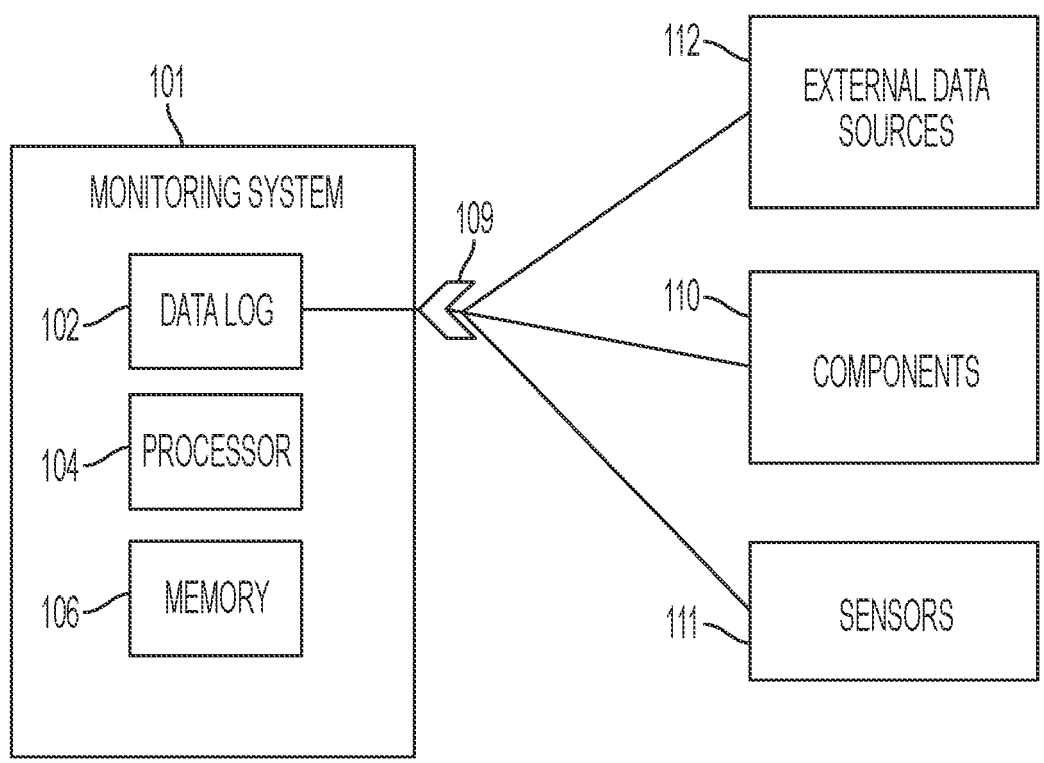
FIG. 1 illustrates example elements of a message monitoring system, as used in the context of a computing system.

This document describes system, apparatus, device, method and/or computer program product embodiments, and/or combinations and sub-combinations of any of the above, for As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Definitions for additional terms that are relevant to this document are included at the end of this Detailed Description.

Monitoring message faults and measuring message latency in an AV system is challenging. Traditional message fault detection and latency measuring systems are not sufficient, as they simply monitor the publish and receive points. However, because of the complex architecture of autonomy-related systems and the number of endpoints involved in such systems, latency can be introduced, and faults can occur at many points within the system.

To address this, the solutions described in this document introduce checkpoints, placed according to interface type, to measure latency of messages between a publisher and a subscriber in a system. At a high level, latency is measured as a difference between T_publisher (time of message transmission) and T_subscriber (time of message receipt). The checkpoints monitor multiple transmission and receipt instances along the way, and they can be used to improve the measurement of message latency. The checkpoints also can help identify faults early if the size of a message at various checkpoints is larger or smaller than expected based on its size at the time of publication.

Notably, this document describes the present solution in the context of an AV. However, the present solution is not limited to AV applications. The present solution may be used in other applications such as other robotic applications, radar system applications, metric applications, and/or system performance applications.

A monitoring system for a computing system is a set of hardware that is communicatively and/or electrically connected to various components (such as sensors, subsystems, or other elements) of the computing system to collect status or operational parameter values from those components. As illustrated in FIG. 1, a monitoring system 101 for a computing system may include a processor 104 and a memory 106 with programming instructions. The monitoring system 101 also may include a transmitter for transmitting commands and/or data to external electronic devices and/or remote servers. In various embodiments, the monitoring system 101 may be embedded or integral with the computing system's other components, or it may be a separate device that is in communication with one or more other local subsystems, such as, for example in the context of an AV, an on-board diagnostics system.

The monitoring system 101 may include or be connected to a data logging device 102 that includes a data input 109 (such as a wireless receiver) that is configured to receive device operation data directly or indirectly from the computing system's sensors 111 and other components 110. The monitoring system 101 also may receive information directly or indirectly from one or more external data sources 112. Example components of an AV will be discussed below in the context of FIG. 5, and include components such as camera systems, lidar systems, and autonomous vehicle operating systems. Example external data sources include traffic infrastructure systems, remote operating and guidance systems, global positioning systems (GPS), and the like. In some configurations, the components of an AV may be considered external data sources 112 if they are part of a vehicle subsystem that is separate from (but in communication with) the monitoring system 101.

Figure 2:
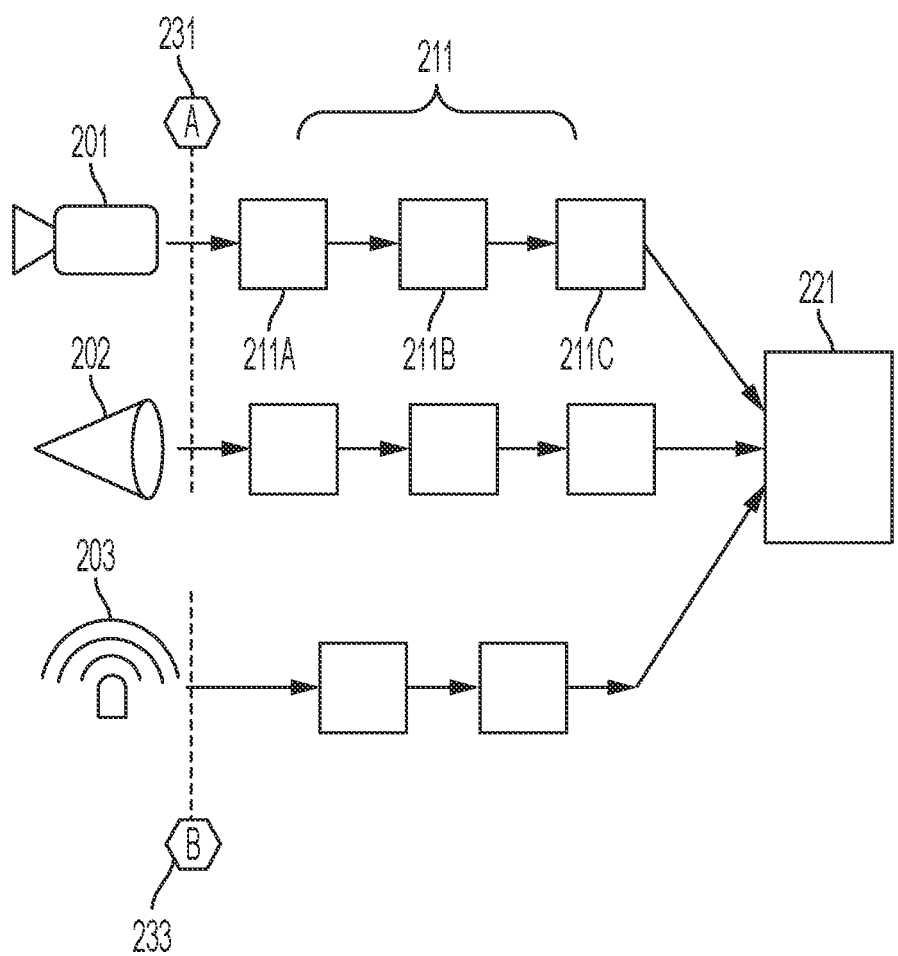
FIG. 2 illustrates an example execution flow involving data from multiple publishers to a subscriber in a computing system.

FIG. 2 illustrates example of how an execution flow may be implemented on data published by various publishers to s subscriber in a computing system. that may be applied to data received from those elements. Using an AV as an example, the vehicle's trajectory generation system 221 may subscribe to data from a variety of publishers such as cameras 201, communication systems 202, and LiDAR system 203, as well as from other components of the vehicle.

The data sent by a publisher may pass through any number of other components 211. For example, FIG. 2 shows that the data published by camera 201 will pass through components 211A, 211B and 211C before it reaches the subscriber 221. Each such component may perform one or more functions of the execution flow on the data. If the monitoring system monitors any of the components 211, such components may be considered to be checkpoints in the communication path between a publisher and subscriber. In addition, in some configurations an independent checkpoint such as checkpoint A 231 or checkpoint B 233 may be located along one or more of the communication paths to provide a monitoring location that is independent of any of the system components. When the monitoring system receives data from any checkpoint, the system will update its data log to include an identifier and time stamp for that data. Optionally, the monitoring system may pass the data log to one or more checkpoints in the execution flow. Each subsequent checkpoint may then update the data log and pass it along to the next checkpoint, with or without retaining a copy of the data log until the data log reaches a checkpoint that is communicatively connected to the monitoring system.

In prior systems that monitored data in a computing system, the monitoring system would simply monitor the starting points (publishers) and endpoints (subscribers) and thus not learn of latency or failure until the end of the execution flow. In the present solution, one or more of the checkpoints will actively send a data log to the monitoring system without waiting for the monitoring system to poll it. This active monitoring further reduces the lag between the occurrence of latency or failure and the system's detection of that condition.

Figure 3:
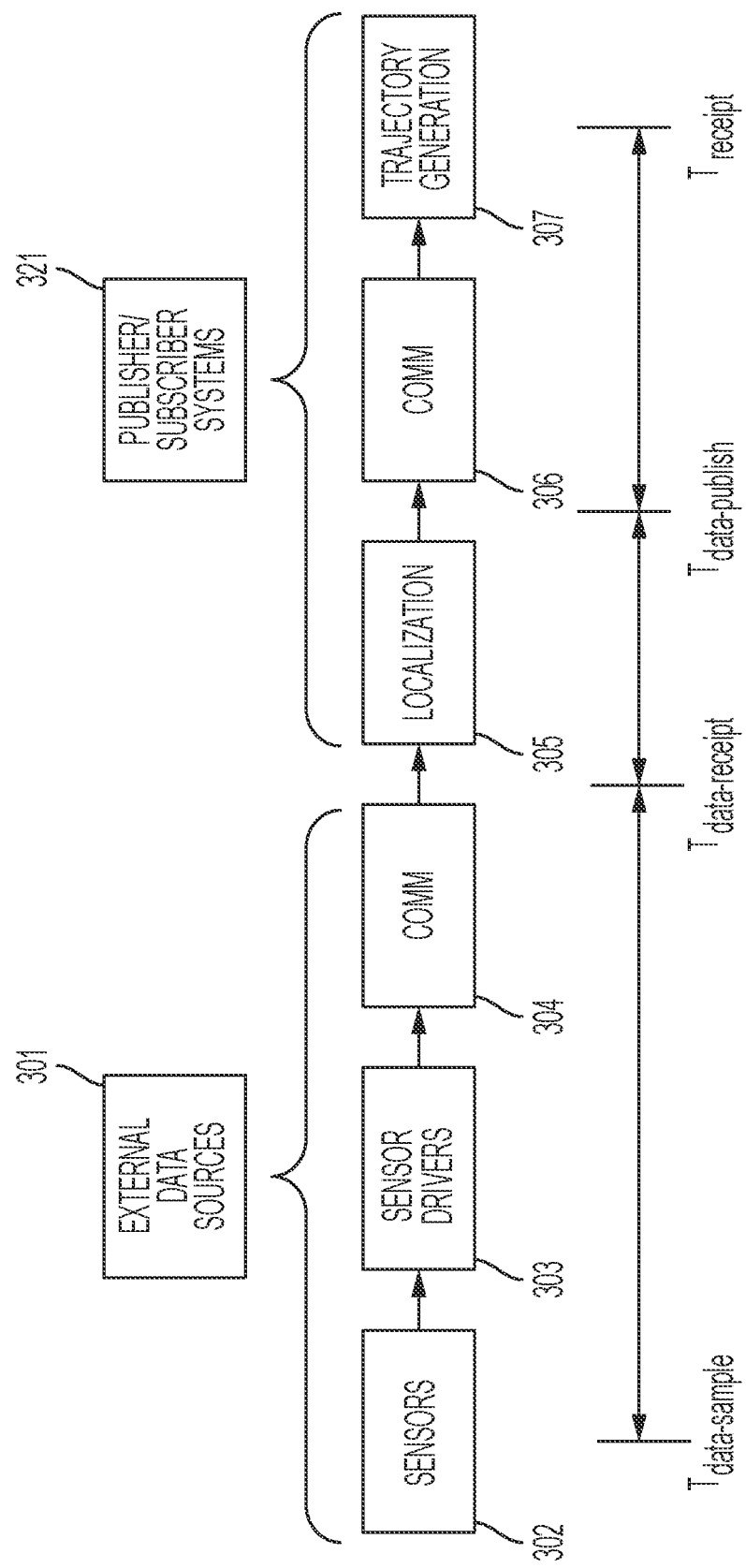
FIG. 3 illustrates an example communication path in an autonomous vehicle, with various vehicle subsystems functioning as publishers, subscribers, or both.

FIG. 3 illustrates an additional example of a communication path between various AV systems, as well as checkpoints along that path. In FIG. 3, various vehicle subsystems 321 are publishers of data to other systems, subscribers to data received from yet other systems, or both publishers and subscribers.

For example, as shown the vehicle's trajectory generation system 307 subscribes to data published by the vehicle's localization system 305. A localization system 305, as is known in the art, is a system that receives data from various sensors and systems and uses that data to identify a current location of the vehicle, typically with reference to a high definition (HD) map. For example, FIG. 3 shows that the localization system 305, in its capacity as a subscriber, receives data from one or more external data sources 301 such as one or more of the vehicle's onboard sensors 302 such as cameras, or any of their corresponding sensor drivers 303. Some of the data from one source or subsystem may pass through various other sources or subsystems before reaching the subscriber. For example, as shown the vehicle's sensor 302 data passes through one or more of the sensor drivers 303 and one or more communication subsystems 304 before reaching the localization system 305. Other data may arrive directly from a publisher.

The localization system 305 may process this data to determine a location of the AV. Then, acting as a publisher, the localization system 305 it may pass the resulting data (which may include the data received from any of the external data sources 301 and/or the results of the localization system's processing of that data) to the trajectory generation system 307, optionally via a communication subsystem 306.

FIG. 3 also shows various time intervals that a monitoring system may consider when determining whether latency or failure of communications is occurring. In the example of FIG. 3, the label T_data-sample refers to a time instant at which a checkpoint associated with a sensor 302 publishes information. The label T_data-receipt refers to a time instant at which a checkpoint associated with the localization system 305 receives this information. The label T_data-publish refers to a time instant at which a checkpoint associated with the localization system 305 indicates that the localization system 305 published its results. The label T_receipt refers to a time instant at which a checkpoint associated with the trajectory generation system 307 received the information published by the localization system 305.

Figure 4:
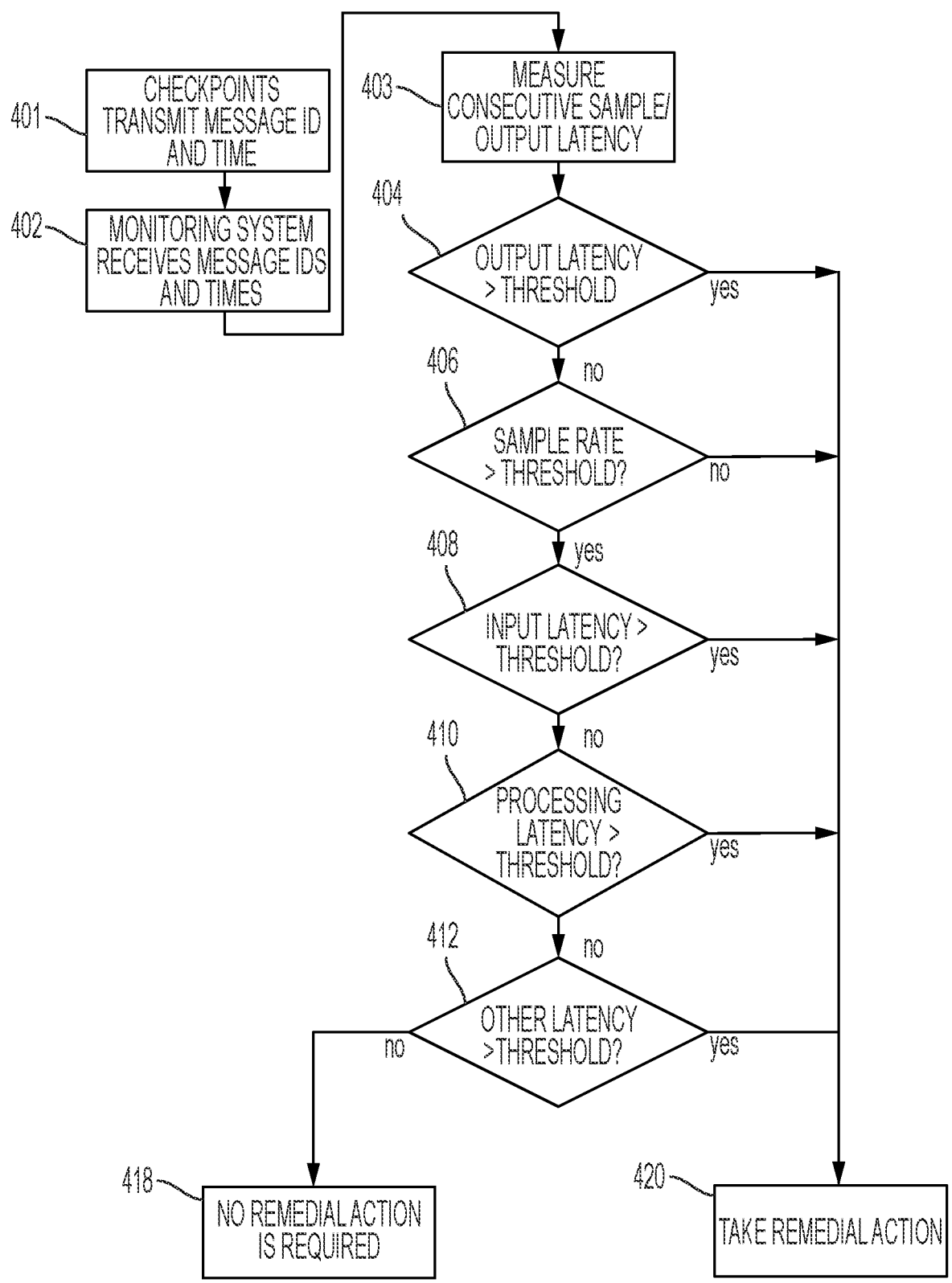
FIG. 4 is a flow diagram illustrating an example process by which a system may measure latency or fault in communications.

FIG. 4 illustrates a process by which the monitoring system will identify latency and failure when it occurs in a system such as that shown in FIGS. 2 and 3. Each message that passes through the system will have a message identifier (ID) that uniquely identifies that message with respect to other messages in the system. When a message pass through any of the checkpoints (whether upon receipt or upon publication), at 401 the checkpoint transmits a notification to the monitoring system that includes the message ID and a timestamp indicating when the message was at the checkpoint. The timestamp may indicate the time of that the checkpoint received the message, published the message, or published a result derived from processing the message.

At 402 the monitoring system receives each of these notifications and processes them to measure various whether any message has failed to reach an intended destination, or whether the message's delivery is falling behind the system's expectations (i.e., whether the system is failing to satisfy a threshold and thus exhibiting latency in delivering messages).

For example, when processing the notifications, the system may determine a consecutive sample latency (404), which represents the time difference between the time of publication of a first message by a publisher and the time of publication of a subsequent message from the same publisher. For example, referring to FIG. 3, the consecutive sample latency for messages published by the operating system 302 will be the difference between $T^N$_data-sample and $T^{N+1}$_data-sample, while the consecutive sample latency for messages published by the localization system 305 will be the difference between $T^N$_data-publish and $T^{N+1}$_data-publish. If the measured consecutive sample latency exceeds a threshold maximum amount (404: YES), the monitoring system may notify another system to take an action (420), examples of which will be described below.

When processing the notifications, the system also may determine a sample rate (406), which represents the rate by which messages pass through and are output by the checkpoint over a window of time. For example, an inertial measurement unit (IMU) or a vehicle pose calculation subsystem may be expected to publish at least a minimum number of messages in a period of time. If the threshold is not met, that may indicate that technical issues exist with respect to operation of the data source (IMU or pose determination) or other parts of the system between the data source and the monitoring system. The system may also look for reductions in the sample rate by setting the minimum number of expected messages threshold to be equal to, or a function of the number of messages received over one or more previous time windows. The function may be an average, a mean, or a percentage such as 90 percent. If the minimum threshold number of expected messages are not received over a period of time (i.e., if the sample rate is below a threshold) (406: NO), the monitoring system may notify another system to take a remedial action (420), examples of which will be described below.

When processing the notifications, the system also may determine input latency (408), which represents the time between when a message is received by a first checkpoint and the message (or a related message) is received by a second checkpoint. For example, referring to FIG. 3, the input latency for a message published by the operating system 302 will be the difference between T_data-sample and T_data-receipt. If the measured input latency exceeds a threshold maximum latency that is considered to be acceptable (408: YES), the monitoring system may notify another system to take a remedial action (420), examples of which will be described below.

When processing the notifications, the system also may determine processing latency (410), which represents the time between when a message is received by a checkpoint and the message is processed by that checkpoint. For example, referring to FIG. 3, the processing latency for a localization system 305 will be, for each message, the difference between T_data_receipt and T_data_publish. If the measured input latency exceeds a threshold (410: YES), the monitoring system may notify another system to take a remedial action (420), examples of which will be described below.

When processing the notifications, the system also may measure any of multiple other data latency parameters (412). For example, the system may determine the time for a single function to complete, or the time between any two functions. By way of example in an AV, the system may measure the time between the time of receipt of a lidar sweep by a pose estimator the time that the pose estimator outputs a new pose measurement. If the measured latency exceeds a threshold (412: YES), the monitoring system may notify another system to take a remedial action (420), examples of which will be described below.

If none of the measurements trigger a remedial action, then the system may not be experiencing faults or unacceptable latency, and no remedial action may be required (418).

The example measurements shown in FIG. 4 and discussed above need not be performed in the order shown. The sequence may change to re-order the steps. In addition, some or all of the measurements may occur at the same time, especially if the monitoring system uses a multi-core processor that is capable of parallel processing. In addition, fewer than all of the measurements shown may be determined, and/or additional measurements may be determined, in various configurations.

In addition, the decision boxes described above may or may not trigger a remedial action based on a single message. In some embodiments, for at least some monitored checkpoints the system may determine that remedial action is required only if a minimum number of messages exhibit latency or fault over a specified period of time at that checkpoint.

Any or all of the latencies or faults described above may trigger any of various remedial actions at 420. For example, a latency or fault may send a signal to an onboard diagnostics system that triggers activation of an automated diagnostics function and/or display or transmission of an alert. A latency or fault may trigger a command to the vehicle's trajectory generation system that instructs the vehicle to pull over and stop at a suitable parking location. A latency or fault may trigger a command to the vehicle's autonomous vehicle operating system to switch from an autonomous mode to a manual mode that requires a passenger in the vehicle to assume the role of an operator (i.e., driver) of the vehicle. Other remedial actions may occur in various embodiments. The system may be programmed with rules to guide the system's selection of a particular remedial action depending on a type, duration, or magnitude of a particular latency or fault.

Figure 5:
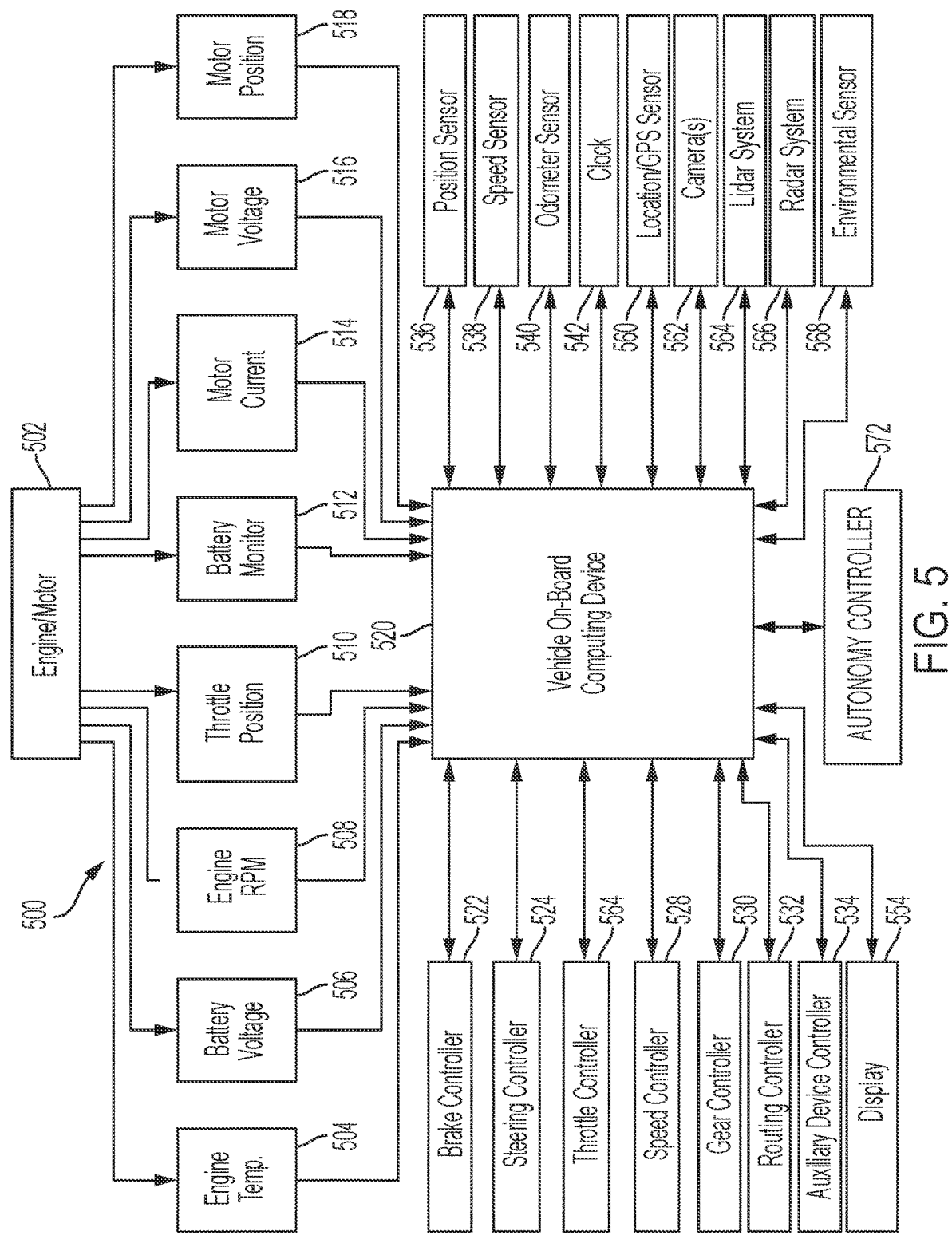
FIG. 5 illustrates an example architecture for a vehicle, in accordance with aspects of the disclosure.

FIG. 5 illustrates an example system architecture 500 for a vehicle, in accordance with aspects of the disclosure. As shown in FIG. 5, system architecture 500 for a vehicle includes an engine or motor 502 and various sensors 504-518 for measuring various parameters of the vehicle. In gas-powered or hybrid vehicles having a fuel-powered engine, the sensors may include, for example, an engine temperature sensor 504, a battery voltage sensor 506, an engine revolutions per minute ("RPM") sensor 508, and a throttle position sensor 510. If the vehicle is an electric or hybrid vehicle, then the vehicle may have an electric motor, and accordingly includes sensors such as a battery monitoring system 512 (to measure current, voltage and/or temperature of the battery), motor current 514 and voltage 516 sensors, and motor position sensors 518 such as resolvers and encoders.

Operational parameter sensors that are common to both types of vehicles include, for example: a position sensor 536 such as an accelerometer, gyroscope and/or inertial measurement unit; a speed sensor 538; and an odometer sensor 540. The vehicle also may have a clock 542 that the system uses to determine vehicle time during operation. The clock 542 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 560 (such as a Global Positioning System ("GPS") device); object detection sensors such as one or more cameras 562; a lidar system 564; and/or a radar and/or a sonar system 566. The sensors also may include environmental sensors 568 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 520. The on-board computing device 520 may be implemented using a computer system such as that shown in FIG. 6. The vehicle on-board computing device 520 analyzes the data captured by the sensors and optionally controls operations of the vehicle based on results of the analysis. For example, the vehicle on-board computing device 520 may control: braking via a brake controller 522; direction via a steering controller 524; speed and acceleration via a throttle controller 526 (in a gas-powered vehicle) or a motor speed controller 528 (such as a current level controller in an electric vehicle); a differential gear controller 530 (in vehicles with transmissions); and/or other controllers. Auxiliary device controller 534 may be configured to control one or more auxiliary devices, such as testing systems, auxiliary sensors, mobile devices transported by the vehicle, etc.

Geographic location information may be communicated from the location sensor 560 to the on-board computing device 520, which may then access a map of the environment that corresponds to the location information to determine known fixed features of the environment such as streets, buildings, stop signs and/or stop/go signals. Captured images from the cameras 562 and/or object detection information captured from sensors such as lidar system 564 is communicated from those sensors) to the on-board computing device 520. The object detection information and/or captured images are processed by the on-board computing device 520 to detect objects in proximity to the vehicle. Any known or to be known technique for making an object detection based on sensor data and/or captured images can be used in the embodiments disclosed in this document.

Lidar information is communicated from lidar system 564 to the on-board computing device 520. Additionally, captured images are communicated from the camera(s) 562 to the vehicle on-board computing device 520. The lidar information and/or captured images are processed by the vehicle on-board computing device 520 to detect objects in proximity to the vehicle. The manner in which the object detections are made by the vehicle on-board computing device 520 includes such capabilities detailed in this disclosure.

In addition, the system architecture 500 may include an onboard display device 554 that may generate and output an interface on which sensor data, vehicle status information, or outputs generated by the processes described in this document are displayed to an occupant of the vehicle. The display device may include, or a separate device may be, an audio speaker that presents such information in audio format.

The on-board computing device 520 may include and/or may be in communication with a routing controller 532 that generates a navigation route from a start position to a destination position for an autonomous vehicle. The routing controller 532 may access a map data store to identify possible routes and road segments that a vehicle can travel on to get from the start position to the destination position. The routing controller 532 may score the possible routes and identify a preferred route to reach the destination. For example, the routing controller 532 may generate a navigation route that minimizes Euclidean distance traveled or other cost function during the route, and may further access the traffic information and/or estimates that can affect an amount of time it will take to travel on a particular route. Depending on implementation, the routing controller 532 may generate one or more routes using various routing methods, such as Dijkstra's algorithm, Bellman-Ford algorithm, or other algorithms. The routing controller 532 may also use the traffic information to generate a navigation route that reflects expected conditions of the route (e.g., current day of the week or current time of day, etc.), such that a route generated for travel during rush-hour may differ from a route generated for travel late at night. The routing controller 532 may also generate more than one navigation route to a destination and send more than one of these navigation routes to a user for selection by the user from among various possible routes.

In various embodiments, the on-board computing device 520 may determine perception information of the surrounding environment of the vehicle. Based on the sensor data provided by one or more sensors and location information that is obtained, the on-board computing device 520 may determine perception information of the surrounding environment of the vehicle. The perception information may represent what an ordinary driver would perceive in the surrounding environment of a vehicle. The perception data may include information relating to one or more objects in the environment of the vehicle. For example, the on-board computing device 520 may process sensor data (e.g., lidar or radar data, camera images, etc.) in order to identify objects and/or features in the environment of the vehicle. The objects may include traffic signals, roadway boundaries, other vehicles, pedestrians, and/or obstacles, etc. The on-board computing device 520 may use any now or hereafter known object recognition algorithms, video tracking algorithms, and computer vision algorithms (e.g., track objects frame-to-frame iteratively over a number of time periods) to determine the perception.

In some embodiments, the on-board computing device 520 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The on-board computing device 520 may perform one or more prediction and/or forecasting operations. For example, the on-board computing device 520 may predict future locations, trajectories, and/or actions of one or more objects. For example, the on-board computing device 520 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the on-board computing device 520 may predict whether the object will likely move straight forward or make a turn. If the perception data indicates that the intersection has no traffic light, the on-board computing device 520 may also predict whether the vehicle may have to fully stop prior to entering the intersection.

In various embodiments, the on-board computing device 520 may determine a motion plan for the autonomous vehicle. For example, the on-board computing device 520 may determine a motion plan for the autonomous vehicle based on the perception data and/or the prediction data. Specifically, given predictions about the future locations of proximate objects and other perception data, the on-board computing device 520 can determine a motion plan for the AV that best navigates the autonomous vehicle relative to the objects at their future locations.

In some embodiments, the on-board computing device 520 may receive predictions and make a decision regarding how to handle objects and/or actors in the environment of the vehicle. For example, for a particular actor (e.g., a vehicle with a given speed, direction, turning angle, etc.), the on-board computing device 520 decides whether to overtake, yield, stop, and/or pass based on, for example, traffic conditions, map data, state of the autonomous vehicle, etc. Furthermore, the on-board computing device 520 also plans a path for the vehicle to travel on a given route, as well as driving parameters (e.g., distance, speed, and/or turning angle). That is, for a given object, the on-board computing device 520 decides what to do with the object and determines how to do it. For example, for a given object, the on-board computing device 520 may decide to pass the object and may determine whether to pass on the left side or right side of the object (including motion parameters such as speed). The on-board computing device 520 may also assess the risk of a collision between a detected object and the vehicle. If the risk exceeds an acceptable threshold, it may determine whether the collision can be avoided if the autonomous vehicle follows a defined vehicle trajectory and/or implements one or more dynamically generated emergency maneuvers is performed in a time period (e.g., N milliseconds). If the collision can be avoided, then the on-board computing device 520 may execute one or more control instructions to perform a cautious maneuver (e.g., mildly slow down, accelerate, change lane, or swerve). In contrast, if the collision cannot be avoided, then the on-board computing device 520 may execute one or more control instructions for execution of an emergency maneuver (e.g., brake and/or change direction of travel).

Any or all of the autonomy functions described above may be performed by an autonomy controller 572, which is a processor and a memory, either integral with or in communication with the on-board computing device 520, that includes computer program instructions for performing the routing, motion planning, predicting, motion control, and other autonomy-related functions described above.

As discussed above, planning and control data regarding the movement of the autonomous vehicle is generated for execution. The on-board computing device 520 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 6:
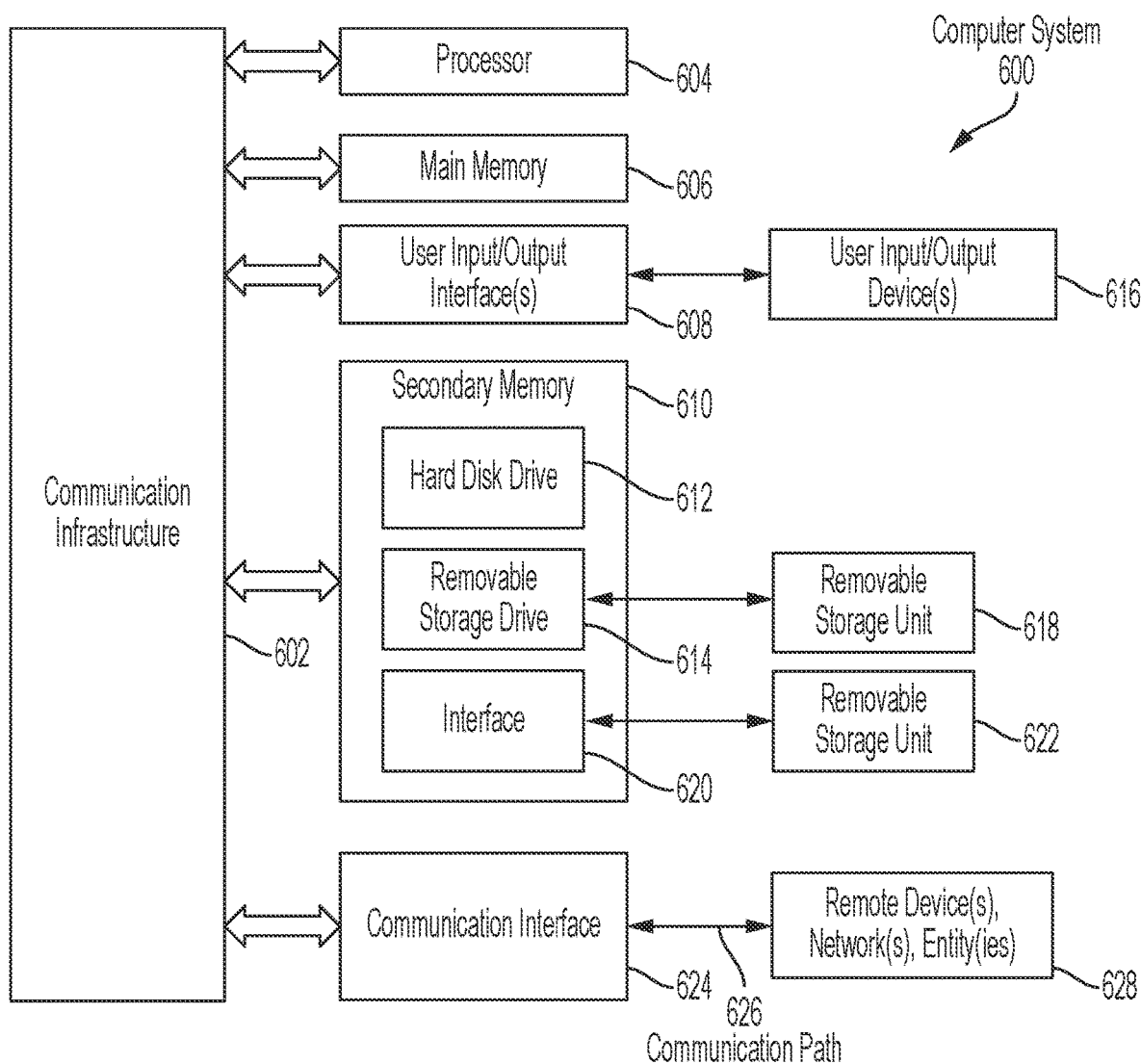
FIG. 6 is an example computer system useful for implementing various embodiments

Various embodiments can be implemented, for example, using one or more computer systems, such as computer system 600 shown in FIG. 6. Computer system 600 can be any computer capable of performing the functions described in this document. For example, as described above computer system 600 may serve as a vehicle's monitoring system, localization system, trajectory generation system, and/or any other subsystem of the vehicle.

Computer system 600 includes one or more processors (also called central processing units, or CPUs), such as a processor 604. Processor 604 is connected to a communication infrastructure or bus 602. Optionally, one or more of the processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 616, such as monitors, keyboards, pointing devices, etc., that communicate with communication infrastructure 602 through user input/output interface(s) 608.

Computer system 600 also includes a main or primary memory 606, such as random access memory (RAM). Main memory 606 may include one or more levels of cache. Main memory 606 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 614 reads from and/or writes to removable storage unit 618 in a well-known manner.

According to an example embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 600, main memory 606, secondary memory 610, and removable storage units 618 and 622, as well as tangible articles of manufacture embodying any combination of the foregoing. Such control logic, when executed by one or more data processing devices (such as computer system 600), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, various embodiments can operate with software, hardware, and/or operating system implementations other than those described in this document.

Figure 7:
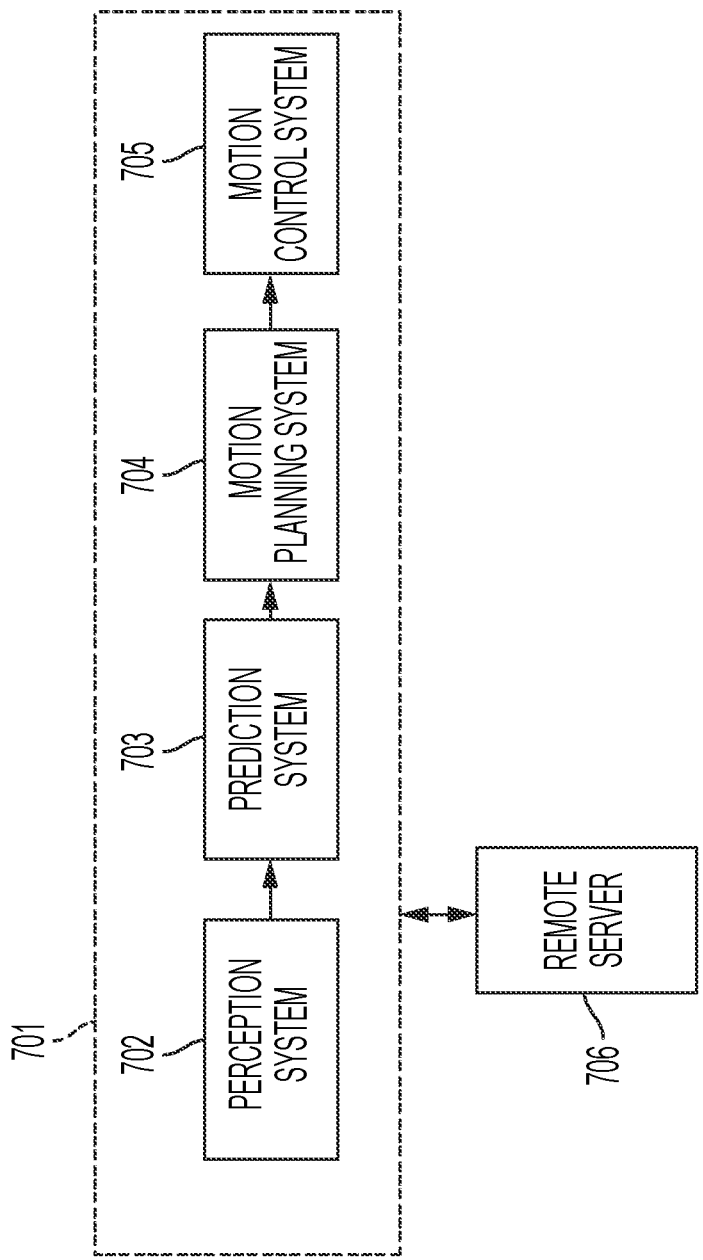
FIG. 7 is a block diagram that illustrates example subsystems of an autonomous vehicle.

FIG. 7 shows a high-level overview of vehicle subsystems that may be relevant to the discussion above. Specific components within such systems are described in the discussion of FIG. 5 in this document. Certain components of the subsystems may be embodied in processor hardware and computer-readable programming instructions that are part of the vehicle on-board computing system 701.

The subsystems may include a perception system 702 that includes sensors that capture information about moving actors and other objects that exist in the vehicle's immediate surroundings. Example sensors include cameras, lidar sensors and radar sensors. The data captured by such sensors (such as digital image, lidar point cloud data, or radar data) is known as perception data. The perception data may include data representative of one or more objects in the environment. The perception system may include one or more processors, along with a computer-readable memory with programming instructions and/or trained artificial intelligence models that, during a run of the vehicle, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

If the vehicle is an AV, the vehicle's perception system 702 may deliver perception data to the vehicle's prediction system 703. The prediction system (which also may be referred to as a forecasting system) will include processors and computer-readable programming instructions that are configured to process data received from the perception system and predict actions of other actors that the perception system detects.

In an AV, the vehicle's perception system, as well as the vehicle's prediction system, will deliver data and information to the vehicle's motion planning system 704 and motion control system 705 so that the receiving systems may assess such data and initiate any number of reactive motions to such data. The motion planning system 704 and control system 705 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause the vehicle hardware to take include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

In non-AV embodiments, such as with vehicles that are driven by human operators, the motion planning system 704 may be embodied in processor hardware and computer-readable hardware that are part of an electronic devices that is contained with the vehicle, such as a dashboard navigation system or a mobile electronic device of the operator. In such situations, the electronic device may output the trajectories planned by the motion planning system via a display, an audio speaker, or both. In addition, some parts of the perception system 702 may include a transceiver of an electronic device that receives certain perception data (such as weather data) from a remote server via wireless communication.

The vehicle's on-board computing system 701 will be in communication with a remote server 706. The remote server 706 is an external electronic device that is in communication with the vehicle's on-board computing system 701, either via a wireless connection while the vehicle is making a run, or via a wired or wireless connection while the vehicle is parked at a docking facility or service facility. The remote server 706 may receive data that the vehicle collected during its run, such as perception data and operational data. The remote server 706 also may transfer data or other information to the vehicle such as software updates, high definition (HD) map updates, machine learning model updates and other information.

Terms that are relevant to this disclosure include:

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices, which may be components of a single device or components of separate devices, together or collectively perform a process.

The term "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. The term "computing system" refers to a system that includes one or more computing devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "execution flow" refers to a sequence of functions that are to be performed in a particular order. A function refers to one or more operational instructions that cause a system to perform one or more actions. In various embodiments, an execution flow may pertain to the operation of an automated device. For example, with respect to an AV, a particular execution flow may be executed by the vehicle in a certain situation such as, for example, when the vehicle is stopped at a red stop light that has just turned green. For instance, this execution flow may include the functions of determining that the light is green, determining whether there are any obstacles in front of or in proximity to the vehicle and, only if the light is green and no obstacles exist, accelerating. When a subsystem of an automated device fails to perform a function in an execution flow, or when it performs a function out of order in sequence, the error may indicate that a fault has occurred or that another issue exists with respect to the execution flow.

The term "communication path" mean a wired or wireless path via which a first device subsystem of a device sends communication signals to and/or receives communication signals from one or more other devices and/or subsystems. The path may be a single path of a single type, or a collection of different paths of multiple types. Devices and subsystems are "communicatively connected" if they are able to send and/or receive data via a communication link. "Electronic communication" refers to the transmission of data via one or more signals between two or more electronic devices or subsystems, whether through a wired or wireless network, and whether directly or indirectly via one or more intermediary devices. The term "wireless communication" refers to communication between two devices or subsystems in which at least a portion of the communication path includes a signal that is transmitted wirelessly, but it does not necessarily require that the entire communication path be wireless.

In this document, when terms such as "first" and "second" are used to modify a noun, such use is simply intended to distinguish one item from another, and is not intended to require a sequential order unless specifically stated.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

As described above, this document discloses system, method, and computer program product embodiments for identifying latency and/or fault in communications between components of one or more computing systems. The system embodiments include, at a minimum, a processor and a computer-readable memory. In some embodiments, the system is a vehicle such as an autonomous vehicle. The computer program embodiments include programming instructions, e.g., stored in a memory, to cause a processor to perform the data management methods described in this document. The system embodiments also include a processor which is configured to perform the methods described in this document, e.g., via the programming instructions. More generally, the system embodiments include a system comprising means to perform the steps of any of the methods described in this document.

Without excluding further possible embodiments, certain example embodiments are summarized in the following clauses:

Clause 1: A method of detecting a fault or latency in an autonomous vehicle, the method comprising: in a computing system via which messages are received from subsystems of the vehicle that are publishers and transferred along a communication path to subsystems of the vehicle that are subscribers: (i) receiving, from a plurality of checkpoints along the communication path, for each of a group of messages that are transmitted along the communication path, a message ID and a timestamp indicating when the checkpoint receives the message, publishes the message, or publishes a result derived from the message; (ii) using the message IDs and the timestamps to measure an amount of latency that occurred in the communication path before that message reached its corresponding subscriber; and (iii) upon determining that the measured latency does not satisfy a threshold, sending a signal to a system of the vehicle to take a remedial action.

Clause 2: The method of clause 1, wherein: (i) measuring the amount of latency comprises determining a difference between a time that a first message is published by a first checkpoint and a time that a subsequent message is published by the first checkpoint; and (ii) determining that the measured latency does not satisfy the threshold comprises determining that the difference exceeds a maximum consecutive sample latency threshold.

Clause 3: The method of clause 1 or 2, wherein: (i) measuring the amount of latency comprises measuring a sample rate of messages passing through a first checkpoint; and (ii) determining that the measured latency does not satisfy the threshold comprises determining that the sample rate is below a minimum expected sample rate.

Clause 4: The method of clause 3, further comprising determining the minimum expected sample rate as a function of a sample rate of messages that passed through the first checkpoint over a previous time window.

Clause 5: The method of any of clauses 1-4, wherein: (i) measuring the amount of latency comprises, for two of the checkpoints, determining an input latency as a difference between a time it took for a first message to travel between the two checkpoints; and (ii) determining that the measured latency does not satisfy the threshold comprises determining that the input latency exceeds a maximum acceptable input latency.

Clause 6: The method of any of clauses 1-5, wherein: (i) measuring the amount of latency comprises, for two of the checkpoints, determining an input latency as a difference between a time it took for a first message to travel between the two checkpoints and the time it took for a second message to travel between the two checkpoints; and (ii) determining that the measured latency does not satisfy the threshold comprises determining that the input latency exceeds a maximum acceptable input latency.

Clause 7: The method of any of clauses 1-6, wherein measuring the amount of latency comprises: determining a processing latency as a difference between a first checkpoint received a first message and time when the first checkpoint publishes the first message or a result that the first checkpoint derived from the first message; and determining that the measured latency does not satisfy the threshold comprises determining that the processing latency exceeds a maximum processing latency.

Clause 8: The method of any of clauses 1-7, wherein, for at least one of the checkpoints, sending the signal to the system of the vehicle to take a remedial action comprises doing so only after determining that the measured latency of a plurality of messages at that checkpoint over a time window does not satisfy a threshold.

Clause 9: The method of any of clauses 1-8, further comprising, by the system of the vehicle that receives the signal, in response to receiving the signal, performing one or more of the following: initiating an automated diagnostics function; commanding a trajectory generation system generate a trajectory that will cause the vehicle to pull over and stop; or commanding an operating system of the vehicle to switch from an autonomous mode to a manual mode that requires a passenger in the vehicle to drive the vehicle.

The breadth and scope of this disclosure should not be limited by any of the above-described example embodiments, but should be defined only in accordance with the following claims and their equivalents.

The invention claimed is:

1. A method of detecting a fault or latency in communications between components of a computing systems, the method comprising:
   in a computing system via which messages are received from subsystems of a vehicle that are publishers and transferred along a communication path to subsystems of the vehicle that are subscribers:
   receiving, from a plurality of checkpoints along the communication path, for each of a group of messages that are transmitted along the communication path, a message ID and a timestamp indicating when the checkpoint receives the message, publishes the message, or publishes a result derived from the message;

using the message IDs and the timestamps to measure an amount of latency, as a measured latency, that occurred in the communication path before that message reached its corresponding subscriber, measuring the amount of latency includes at least one of:

for two of the checkpoints, determining an input latency as a difference between a time it took for a first message to travel between the two checkpoints; or for two of the checkpoints, determining the input latency as a difference between the time it took for the first message to travel between the two checkpoints and the time it took for a second message to travel between the two checkpoints;

determining that the measured latency does not satisfy a threshold in response to the input latency exceeding a maximum acceptable input latency; and upon determining that the measured latency does not satisfy the threshold, sending a signal to a system of the vehicle to take a remedial action.

2. The method of claim 1, wherein:

measuring the amount of latency comprises determining a difference between a time that the first message is published by a first checkpoint and a time that a subsequent message is published by the first checkpoint; and determining that the measured latency does not satisfy the threshold in response to the difference exceeding a maximum consecutive sample latency threshold.

3. The method of claim 1, wherein:

measuring the amount of latency comprises measuring a sample rate of messages passing through a first checkpoint; and determining that the measured latency does not satisfy the threshold in response to the sample rate being below a minimum expected sample rate.

4. The method of claim 3, further comprising determining the minimum expected sample rate as a function of a sample rate of messages that passed through the first checkpoint over a previous time window.

5. The method of claim 1, wherein measuring the amount of latency comprises:

determining a processing latency, as the measured latency, as a difference between a first checkpoint received the first message and time when the first checkpoint publishes the first message or a result that the first checkpoint derived from the first message; and determining that the measured latency does not satisfy the threshold in response to the processing latency exceeding a maximum processing latency.

6. The method of claim 1, wherein, for at least one of the checkpoints, sending the signal to the system of the vehicle to take the remedial action comprises doing so only after determining that the measured latency of a plurality of messages at that checkpoint over a time window does not satisfy a threshold.

7. The method of claim 1 further comprising, by the system of the vehicle that receives the signal, in response to receiving the signal, performing one or more of the following:

initiating an automated diagnostics function;

commanding a trajectory generation system to generate a trajectory that will cause the vehicle to pull over and stop; or commanding an operating system of the vehicle to switch from an autonomous mode to a manual mode that requires a passenger in the vehicle to drive the vehicle.

8. A system for monitoring communications in a vehicle, the system comprising:

a monitoring system comprising, onboard a vehicle, a processor and a memory with programming instructions that are configured to cause the processor to:

receive, from a plurality of checkpoints along a communication path between one or more subsystems of the vehicle that are publishers and one or more subsystems of the vehicle that are subscribers, for each of a group of messages that are transmitted along the communication path, a message ID and a timestamp indicating when the checkpoint receives the message, publishes the message, or publishes a result derived from the message;

using the message IDs and the timestamps to measure an amount of latency, as a measured latency, that occurred in the communication path before that message reached its corresponding subscriber, determine a processing latency, as the measured latency, as a difference between a first checkpoint received a first message and time when the first checkpoint publishes the first message or a result that the first checkpoint derived from the first message;

determine that the measured latency does not satisfy a threshold in response to the processing latency exceeding a maximum processing latency; and upon determining that the measured latency does not satisfy the threshold, sending a signal to a system of the vehicle to take a remedial action.

9. The system of claim 8, wherein:

the instructions to measure the amount of latency cause the processor to determine a difference between a time that the first message is published by the first checkpoint and a time that a subsequent message is published by the first checkpoint; and the instructions cause the processor to determine that the measured latency does not satisfy the threshold in response to the difference exceeds a maximum consecutive sample latency threshold.

10. The system of claim 8, wherein:

the instructions to measure the amount of latency cause the processor to measure a sample rate of messages passing through a first checkpoint; and the instructions cause the processor to determine that the measured latency does not satisfy the threshold in response to the sample rate being below a minimum expected sample rate.

11. The system of claim 10, wherein the instructions cause the processor to determine the minimum expected sample rate as a function of a sample rate of messages that passed through the first checkpoint over a previous time window.

12. The system of claim 10, wherein:

the instructions to measure the amount of latency cause the processor to, for two of the checkpoints, determine an input latency as a difference between a time it took for the first message to travel between the two checkpoints; and the instructions cause the processor to determine that the measured latency does not satisfy the threshold in response to the input latency exceeding a maximum acceptable input latency.

13. The system of claim 8, wherein:
the instructions to measure the amount of latency cause the processor to, for two of the checkpoints, determine an input latency as a difference between a time it took for the first message to travel between the two checkpoints and the time it took for a second message to travel between the two checkpoints; and
the instructions cause the processor to determine that the measured latency does not satisfy the threshold in response to the input latency exceeding a maximum acceptable input latency.

14. The system of claim 8, wherein the instructions to send the signal to the system of the vehicle to take a remedial action comprise, for at least one of the checkpoints, do so only after determining that the measured latency of a plurality of messages at that checkpoint over a time window does not satisfy a threshold.

15. The system of claim 8 further comprising instructions to cause the system of the vehicle that receives the signal to perform one or more of the following:
initiate an automated diagnostics function;
command a trajectory generation system to generate a trajectory that will cause the vehicle to pull over and stop; or
command an operating system of the vehicle to switch from an autonomous mode to a manual mode that requires a passenger in the vehicle to drive the vehicle.

16. A computer program product comprising a memory and programming instructions that are configured to cause a processor to, in a computing system via which messages are received from subsystems that are publishers and transferred along a communication path to subsystems that are subscribers, monitor communications by:
receiving, from a plurality of checkpoints along a communication path between one or more of the subsystems that are publishers and one or more of the subsystems that are subscribers, for each of a group of messages that are transmitted along the communication path, a message ID and a timestamp indicating when the checkpoint receives the message, publishes the message, or publishes a result derived from the message;
using the message IDs and the timestamps to measure an amount of latency that occurred in the communication path before that message reached its corresponding subscriber, to measure the amount of latency, as a measured latency, the instructions further cause the processor to perform one or more of the following:
determine a difference between a time that a first message is published by a first checkpoint and a time that a subsequent message is published by the first checkpoint;
measure a sample rate of messages passing through the first checkpoint;
for two of the checkpoints, determine an input latency as a difference between the time it took for the first message to travel between the two checkpoints; or
for two of the checkpoints, determine the input latency as the difference between the time it took for the first message to travel between the two checkpoints and the time it took for a second message to travel between the two checkpoints; and
upon determining that the measured latency does not satisfy a threshold, causing the computing system to take a remedial action.

* * * * *